United States Patent

Lempfer et al.

[11] Patent Number: 5,102,596
[45] Date of Patent: Apr. 7, 1992

[54] METHOD OF PRODUCING SHAPED ARTICLES OF FIBER/BINDER MIXTURES

[75] Inventors: Karsten Lempfer, Tönisvorst; Satish Gupta, Krefeld, both of Fed. Rep. of Germany

[73] Assignee: G. Siempelkamp GmbH & Co., Krefeld, Fed. Rep. of Germany

[21] Appl. No.: 620,402

[22] Filed: Nov. 29, 1990

[30] Foreign Application Priority Data

Dec. 1, 1989 [DE] Fed. Rep. of Germany ....... 3939606

[51] Int. Cl.$^5$ .............................................. C04B 7/345
[52] U.S. Cl. ........................... 264/115; 106/731; 106/780; 156/39; 264/333
[58] Field of Search ............ 264/109, 115, 122, 333; 106/731, 780; 156/39

[56] References Cited

U.S. PATENT DOCUMENTS

| | | | |
|---|---|---|---|
| 3,809,566 | 5/1974 | Revord | 106/783 |
| 4,100,242 | 7/1978 | Leach | 264/333 |
| 4,328,178 | 5/1982 | Kossatz | 156/39 |
| 4,406,703 | 9/1983 | Guthrie et al. | 106/731 |
| 4,840,688 | 6/1989 | Vogt | 156/39 |
| 4,902,348 | 2/1990 | Kossatz et al. | 106/780 |
| 4,942,003 | 7/1990 | Bold | 264/40.4 |

FOREIGN PATENT DOCUMENTS 2629196  1/1978  Fed. Rep. of Germany ...... 264/333

*Primary Examiner*—Mary Lynn Theisen
*Attorney, Agent, or Firm*—Herbert Dubno

[57] ABSTRACT

Paper or cellulose pieces forming a fiber raw material are wetted with water prior to comminution so that the comminution into fibers is effected with the moistened raw material. The moisture content of the fibers makes up at least part of the water of hydration required to completely set the binder which is mixed with the fibers. The binder can be plaster (gypsum) or hydraulic cement. The mixture is pressed to the desired shape and heat may be applied.

13 Claims, 1 Drawing Sheet

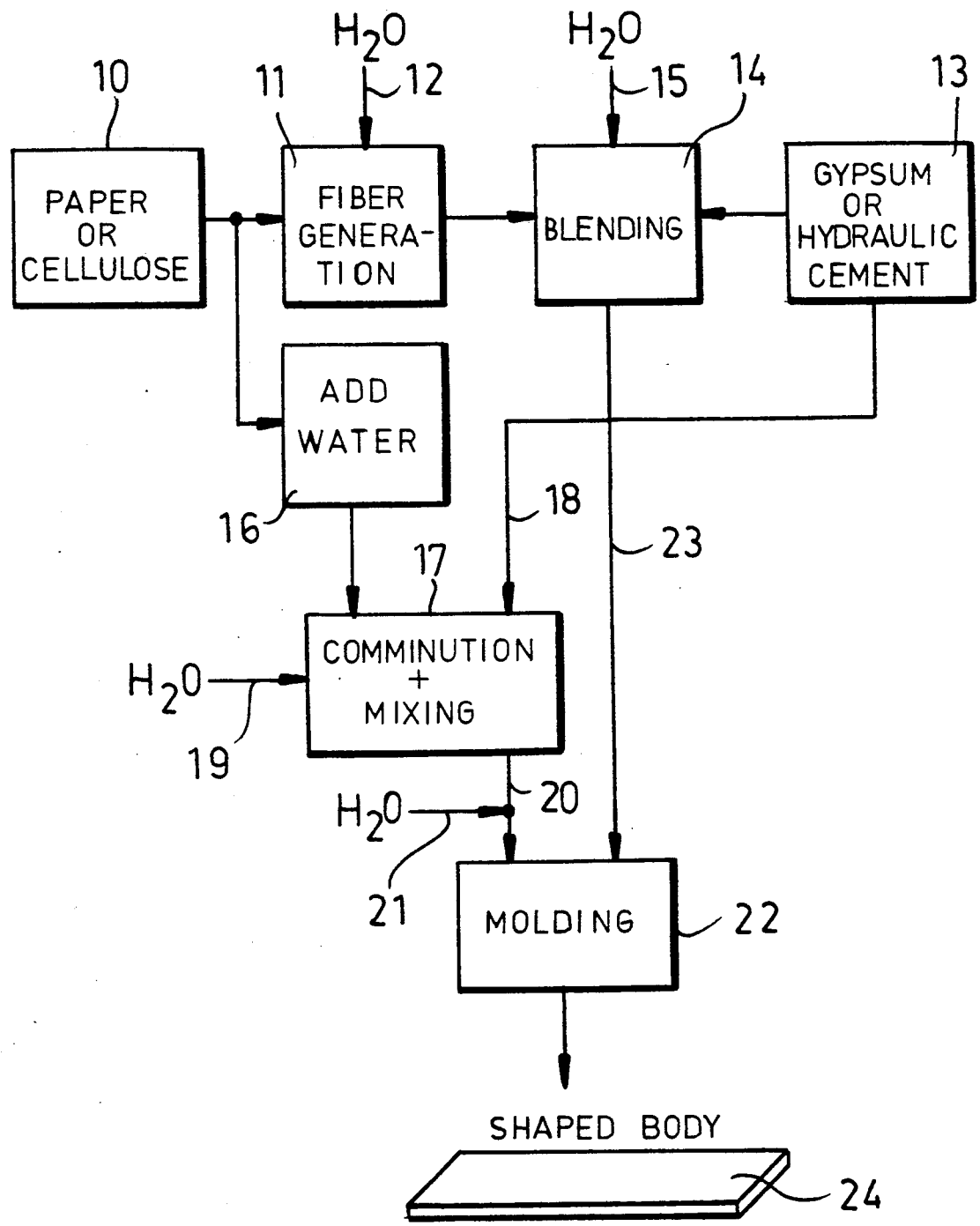

METHOD OF PRODUCING SHAPED ARTICLES OF FIBER/BINDER MIXTURES

FIELD OF THE INVENTION

Our present invention relates to a method of making shaped articles of fiber/binder mixtures containing water of hydration in an amount sufficient to react with the binder to allow the mixture to set in the established shape.

BACKGROUND OF THE INVENTION

In the past, see for example German patent document DE 22 35 537, the fiber raw material was comminuted in a dry state to produce the fibers which were then mixed with the binder and water. The binder used is generally a finely divided hydratable binder, i.e. a binder which reacts in the presence of water of hydration to form a hydrated form which solidifies.

Such mixtures are shaped by pressure to form the shaped article which can be of sheet, slab, brick, block or structural shape, such as that of a girder, or some other shape, like that of a pipe, used in building construction or the like. In some cases, apart from pressure, it is also possible to use heat in shaping and setting the finished article.

In the prior technique described, the fiber raw material and the hydratable binder may be milled together and thereby also mixed, the milling serving to break up the fiber raw material to produce the fibers. The fiber raw material can be subjected to comminution independently of its mixing with the hydratable binder and then mixed with the latter. In both cases, the water of hydration is added after the mixing of the dry ingredients.

The problem with such systems, in which the water of hydration is added after a mixture of the dry ingredients, is that agglomerates easily are produced and these may detrimentally influence the parameters of the product, the homogeneity of the shaped article, strength and the like.

OBJECTS OF THE INVENTION

It is, therefore, the principal object of the present invention to provide an improved method of making shaped articles whereby these drawbacks are avoided.

Another object of the invention is to provide an improved method of making shaped articles whereby the detrimental formation of agglomerates can be avoided and shaped articles of high strength and extraordinarily homogeneous construction can be made.

It is also an object of the invention to provide an improved method of making shaped articles which is simple and economical to carry out and control.

Still another object of the invention is to provide an improved shaped article made from mixtures of fibers and hydratable binders such as gypsum (plaster) or cement (i.e. so-called hydraulic binders).

SUMMARY OF THE INVENTION

These objects and others which will become apparent hereinafter are attained, in accordance with the invention, by comminuting the fiber raw material with at least a part of the water of hydration required for full hydration of the binder and thereby introducing this part of the water of hydration into the fiber/binder mixture in the form of a moistened mass of the fiber. According to the invention, therefore, the moistened fiber raw material is comminuted to produce the fibers in the moistened state.

This result can be achieved in various ways. For example, in a preferred embodiment of the invention, the moistened fiber raw material and the binder are milled together simultaneously, thereby comminuting the fiber raw material to produce the fibers and mixing the moist fibers thus produced and the binder intimately. This technique has been found to give rise to highly homogeneous fiber/binder mixtures which are free from detrimental agglomerates.

It is, however, also possible, in accordance with the invention, to moisten the fiber raw material and to subject it to comminution to produce the fibers independently from any comminution of the binder and then to effect the mixing of the moist mass of fibers and the binder.

The method of the invention can thus comprise:

(a) adding a quantity of water to a raw fiber product and comminuting the raw fiber product in the presence of the quantity of water added to form a mass of fibers containing the water;

(b) combining the mass of fibers with a binder hydratable with water of hydration to cause setting of the binder, thereby forming a mixture of the binder with the fibers, the quantity of water in the mass of fibers providing at least part of the total water required to hydrate the binder;

(c) shaping the mixture under pressure to a shape of an article; and (d) allowing the article to set by reaction of the binder at least in part with water from the mass.

According to another aspect of the invention, the method comprises the steps of:

(a) moistening pieces of paper with a quantity of water;

(b) milling the pieces of paper moistened with the quantity of water and a gypsum binder requiring for setting a certain quantity of water of hydration in a rapidly rotating mill, the quantity of water moistening the pieces of paper making up at least part of the water of hydration to form a mixture of paper fibers, gypsum and water; and (c) shaping the mixture under pressure into a shape of an article and causing the shape to set.

The invention can be carried out with different fiber raw materials. In a preferred embodiment of the invention, the source of the fibers is pieces of paper and/or pieces of cellulose products.

Similarly, various hydratable binders may be used. Preferred is gypsum or plaster, although a hydraulic cement such as Portland cement, can also be used.

It is important to the invention that at least part of the total amount of the water of hydration required for complete reaction and setting of the binder be supplied to the fiber/binder mixture in the form of the moisture in the fiber mass which was present when that fiber mass was comminuted from the fiber raw material.

The total amount of water of hydration should, of course, be so selected that the detrimental formation of agglomerates is avoided.

For most of the fiber raw materials which are used and the binders described, the fiber raw material can contain all of the water of hydration which is required. That means that fibers are wetted with an amount of water equal to that required for full setting of the binder.

From time to time it is advantageous to incorporate into the fiber mass an excess of water beyond that required for complete hydration of the binder or to permit the total amount of water of hydration which is used to be less than that which is required to fully react the binder. The optimal amount of water can be determined empirically with various starting materials by experimentation without undue effort. Surprisingly, in accordance with the invention, an excellent dispersion of the fibers in the binder and an undue bonding of the fibers in the binder can be obtained in the finished product.

The invention is based upon our discovery that it is possible to completely eliminate the problem of agglomerate formations by incorporating all or at least part, preferably most, of the water of hydration in the fiber phase before the mixture of the fiber and binder is formed.

As a consequence, the critical method step of the invention is the admixing of the fibers or the fiber raw materials with sufficient water so that the comminution is effected in a wet state.

The comminution is effected in a mill, for example a hammer mill, a beater mill, a double-flow mill, a fluidized-bed mill, an impact mill or the like.

Especially when, in accordance with the invention, the moistened fiber raw product and the binder are milled together, we have noted that astonishing homogeneity can be attained far superior to the homogeneity characterizing known processes. Surprisingly, moreover, the sieve opening of, for example, the sieve of a hammer mill can be much greater with the moistened fiber raw product, especially pieces of paper, than is the case for dry milling systems. This means that the throughput can be greater and the specific energy consumption reduced. For example, using a hammer mill and a sieve opening dimension of 10 mm$^2$ holes, a very homogeneous fiber/binder mixture can be achieved in accordance with the invention, free from detrimental agglomerates and with a particle or grain size of the coarsest fraction of 1.25 mm below 10%. In spite of the fact that the binder is present during the formation of the mixture, hydration or setting does not occur prematurely.

The timing of the hydration or setting, of course, will depend on the hydratable binder and any retardants which may be added. Any loss of moisture during the common milling of the fiber raw product and the hydratable binder can be compensated by a higher addition of water to the fiber raw material or by spraying water into the mill during the formation of the mixture.

When the fiber component does not contain all of the water required to hydrate the binder, the process is a semi-dry process for producing shaped articles from the fiber/binder mixture. The fiber/binder mixture can be sprayed, e.g. in a mold or on a surface, pressed and hardened, i.e. set, utilizing conventional techniques.

BRIEF DESCRIPTION OF THE DRAWING

The above and other objects, features and advantages of the present invention will become more readily apparent from the following description, reference being made to the accompanying drawing, the sole FIGURE of which is a flow diagram illustrating the invention.

SPECIFIC DESCRIPTION

In the drawing we have shown a source of the fiber raw material at 10, i.e. scrap paper or cellulose pieces which can be fed to a mill 11 generating the fiber in the presence of a quantity of water which is added at 12 and is at least part of that quantity of water required for complete hydration of the gypsum or hydraulic cement supplied at 13. The gypsum or hydraulic cement is mixed intimately with the fibers at 14 in a mixer which may include a mill.

An additional quantity of water may be sprayed into the mill, as shown at 15. Alternatively, the scrap paper or cellulose pieces from the source 10 is combined with water at 16 and delivered to a high-speed mill 17 as previously described. To this mill, gypsum and hydraulic cement are supplied, as represented at 18, and water may be sprayed into the mill, as represented at 19.

The mixture at 20, to which additional water may be added if necessary at 21, is introduced into the mold and there pressed to the desired shape with heating, as represented at 22. The mixture from the mixing stage 14 may alternatively be delivered to the pressing and heating stage 22, as represented at 23. The product is the shaped body 24 which may be allowed to set further with or without heating.

Experiments have shown that the paper raw material should be milled or comminuted with a moisture content of at least 60% by weight and preferably about 180% by weight. This is especially the case when the fiber raw material is scrap paper. A moisture content of 180% by weight means that the fiber raw material can be considered to be wet. The moisture content can be, say, 240% by weight, and in any event is selected so that it is sufficient to supply the requisite quantity of water of hydration.

In general, the fiber component of the fiber/binder mixture will make up 10 to 20% by weight of the dry mass of the mixture prior to hydration. These values are especially advantageous for paper pieces as the raw fiber material and gypsum as the binder.

Preferably the scrap paper is moistened with at least part of the water of hydration and is milled in a rapidly rotating mill together with the gypsum binder and the mixture is then subjected to heat and pressure to shape it to the configuration of the shaped article.

The rapidly rotating hammer mill can have a speed of 2,000 rpm or more. Additional water can be sprayed into the rapidly rotating mill. The milled mixture can also be supplied with water shortly before the imparting of a shape thereto.

The paper pieces should have a moisture content in excess of 60% by weight and preferably around 180% by weight, and the fiber content of the mixture can be 10 to 20% by weight, based upon the dry solids prior to hydration.

We claim:
1. A method of producing shaped articles, comprising the steps of:
    (a) adding a quantity of water to a raw fiber product to form a mass of the raw fiber product moistened with said quantity of water;
    (b) combining said mass of said raw fiber product moistened with said quantity of water with a binder hydratable with water of hydration to cause setting of said binder, thereby forming a mixture of said binder with said mass, said quantity of water in said mass providing at least part of the total water required to hydrate said binder;
    (c) milling said mixture to comminute said mass into fibers and blend said fibers with said binder in said mixture;

(d) thereafter shaping said mixture under pressure to a shape of an article; and (e) allowing said article to set by reaction of said binder at least in part with water from said mass.

2. The method defined in claim 1 wherein said raw fiber product is selected from the group which consists of paper scraps, pieces of cellulose products and mixtures thereof.

3. The method as defined in claim 1 wherein said binder hydratable with water is gypsum.

4. The method defined in claim 1 wherein said mass of raw fiber product contains all of the water necessary for hydration of said binder following step (a).

5. The method defined in claim 1 wherein said mass of fibers is moistened with a quantity of water in excess of the total amount of water required for hydration of said binder.

6. The method defined in claim 1 wherein the amount of water in said mixture for hydration of said binder is so adjusted that the fiber/binder mixture is agglomerate-free.

7. A method of producing shaped articles, comprising the steps of:

(a) moistening pieces of paper with a quantity of water;

(b) milling said pieces of paper moistened with said quantity of water and a gypsum binder requiring for setting a certain quantity of water of hydration in a rapidly rotating mill, said quantity of water moistening said pieces of paper making up at least part of said water of hydration to form a mixture of paper fibers, gypsum and water; and (c) shaping said mixture under pressure into a shape of an article and causing said shape to set.

8. The method defined in claim 7 wherein said pieces of paper are pieces of scrap paper.

9. The method defined in claim 7 wherein said mixture is shaped under heat and pressure in step (c).

10. The method defined in claim 7, further comprising spraying additional water into said mill.

11. The method defined in claim 7 wherein said paper pieces upon introduction into said mill have a moisture content in excess of 60%.

12. The method defined in claim 11 wherein said moisture content is about 180%.

13. The method defined in claim 7 wherein said paper pieces in said mill make up 10 to 20 percent by weight of the dry solids introduced into said mill.

* * * * *